July 31, 1928.
S. RUBEN
1,678,824
ELECTRIC CURRENT RECTIFIER
Filed April 16, 1925
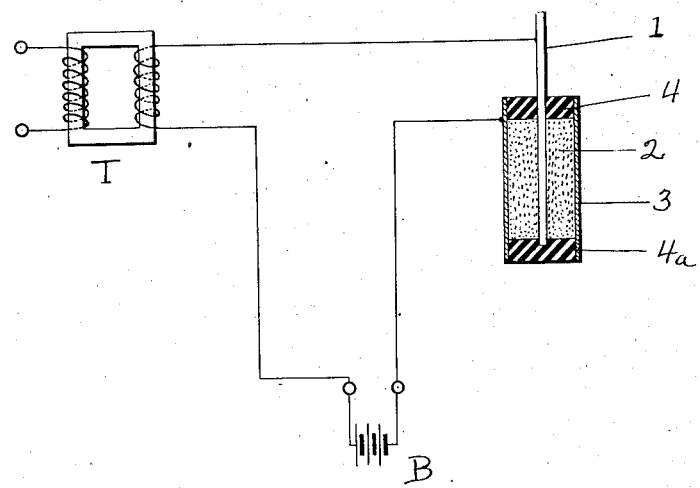
Inventor
SAMUEL RUBEN
By his Attorney Patented July 31, 1928.

1,678,824

UNITED STATES PATENT OFFICE.

SAMUEL RUBEN, OF NEW YORK, N. Y., ASSIGNOR TO RUBEN RECTIFIER CORPORATION OF DELAWARE.

ELECTRIC-CURRENT RECTIFIER.

Application filed April 16, 1925. Serial No. 23,582.

This invention relates to electric current rectifiers and the like, and particularly to the dry surface contact variety, in which electrode elements relatively divergent in the electro-chemical series are disposed in intimate contact to give a rectifying effect.

The object generally of the invention is to provide an improved construction for devices of this character which is efficient, economical and readily manufactured.

More specifically, an object of the invention is to provide an arrangement of the electrode elements in the elemental rectifying or asymmetric couple which provides for a relatively high degree of intimate contact between the electropositive and the electronegative elements, particularly when the latter is in pulverulent form.

Other objects of the invention will in part be obvious and will in part appear hereinafter.

The invention accordingly comprises the features of construction, combination of elements and arrangement of parts which will be exemplified in the construction hereinafter set forth and the scope of the application of which will be indicated in the claims.

This application is a continuation in part of my prior application Serial No. 13,143, filed March 5, 1925.

For a fuller understanding of the nature and objects of the invention reference should be had to the following detailed description taken in connection with the accompanying drawing, in which:

The figure shows, mainly diagrammatically, an elemental asymmetric couple arranged in accordance with the invention and adapted for rectifying and battery-charging service.

In the practice of the present invention the electropositive element comprises a metal of the antimony group in close surface contact with a pulverulent dry film-forming electro-negative material, preferably a metallic oxide. To obtain the most efficient current rectification the surface of the metal electrode should be oxidized before the assembly of the elements of the couple.

The preferred method for producing this oxidized surface is by connecting the electrode as the anode in a direct current circuit at about 150 volts, and in discharging a current thereto when immersed in a saturated solution of a film-forming solution, such as ammonium borate. This preformed oxide coating coacts to maintain readily the inverse current blocking film which obtains at the contacting surface when the electrode is connected as the anode in an alternating current circuit, but permits the flow of current to the adjacent electrode when connected as the cathode, thereby effecting the rectification of the alternating current.

As the electropositive electrode element, various film-forming metals may be used; for example, antimony may be used or one of the kindred metals in the fifth group of the periodic table of chemical elements which have relatively high atomic weights. The metals bismuth, tantalum, antimony and niobium have been found to be satisfactory; metals of less atomic weight than niobium have not been found to be practical. Of the metals enumerated, tantalum is the most satisfactory.

As the electronegative electrode element which is adapted to react to form the oxide film, metallic oxides are employed which serve as an oxide reserve in case the oxide film breaks down. Such metallic oxides may be, for example, the oxides of manganese, the iron oxides, vanadium oxides, and lead peroxide. When tantalum is used, the most efficient of these metallic oxides is lead peroxide.

Relatively satisfactory results are obtained by applying the metallic oxides in powdered form mixed with a chemically inert binder solution, as a thin coating upon the electrode surface, and heating the mixture until the non-conductive components of the binder are burned out, and the particles of the metallic oxide coalesce over the electrode surface. Another method is to hold in close surface contact with the electrode surface the metallic oxide in powdered form.

Referring now to the drawing, an electric circuit is shown, having therein a transformer T, storage battery B and an asymmetric or current rectifying couple in which 1 denotes an oxide coated tantalum electrode strip extending within metal walled container 3, and held in position by insulating plugs 4 and 4ₐ, and in surface contact with a film-forming electronegative powder, lead peroxide, 2. The lead wires are in direct contact with tantalum electrode 1, and the metal wall of container 3.

In operation, as alternating current is applied, current passes to battery B when the tantalum electrode is the cathode, but is blocked and prevented from discharging through the couple by the contact drop of potential between the surfaces of the electropositive tantalum and the cooperating material electronegative to it, when the tantalum is the anode, in this way effecting current rectification.

The formation of the film is of fundamental importance in all dry surface contacting rectifying couples. It has been found that all rectifying couples operating through the contact of an electropositive material with a material electronegative with respect to it, function entirely by a contact drop of potential at that surface. No current rectification effect is obtained if, at the contacting surfaces of those materials the specific resistance is such as not to produce a sufficient drop of potential. It has been found that the tantalum-lead peroxide couple functions when the applied potentials are low, without the production immediately of a tantalum oxide film, but, due to the low specific resistance of lead peroxide, there is an excess inverse current discharge at higher potentials. This is reduced by the film of tantalum oxide resulting from the reaction between the tantalum and the lead peroxide, the film then assisting in the operation of the couple solely by its increased resistance, which is higher than that of lead peroxide.

Should the tantalum oxide film be punctured or otherwise injured, the reaction between the tantalum and the lead peroxide restores it to normal.

Having described my invention, what I claim as new and desire to secure by Letters Patent is:

1. In dry surface contact rectifying devices and the like, an asymmetric couple comprising an electro-positive electrode element formed of a metallic body of the fifth periodic group having a relatively high atomic weight, and an electro-negative electrode element formed of a metallic oxide arranged to coperate in the production of an inverse current blocking film and adapted to be disposed in intimate contact with said electro-positive electrode element.

2. In dry surface contact rectifying devices and the like, an asymmetric couple comprising an electro-positive electrode element formed of a metallic body of the fifth periodic group having a relatively high atomic weight, and an electro-negative electrode element formed of lead peroxide arranged to cooperate in the production of an inverse, current blocking film and adapted to be disposed in intimate contact with said electro-positive electrode element.

3. In dry surface contact rectifying devices and the like, an asymmetric couple comprising an electro-positive electrode element formed of metallic tantalum and an electro-negative electrode element formed of lead peroxide, said electro-negative electrode being in pulverulent form arranged to cooperate in the production of an inverse current blocking film and disposed in intimate contact with said electro-positive electrode element.

4. In dry surface contact rectifying devices and the like, an asymmetric couple comprising an electro-positive electrode element formed of a metallic body of the fifth periodic group having a relatively high atomic weight and having a film coating of an oxide thereof, and an electro-negative electrode element formed of a metallic oxide, said electro-negative electrode element serving as an oxide reserve and being in pulverulent form and disposed in intimate contact with said electro-positive element.

5. In dry surface contact rectifying devices and the like, an asymmetric couple comprising an electro-positive electrode element formed of metallic tantalum and having a film coating of an oxide thereof, and an electro-negative electrode element formed of a metallic oxide, said electro-negative electrode element being in pulverulent form and disposed in intimate contact with said electro-positive electrode element.

6. In dry surface contact rectifying devices and the like, an asymmetric couple comprising an electropositive electrode element formed of a metallic body of the fifth periodic group having an atomic weight at least as great as niobium and having a film coating of oxide, and an electronegative electrode element formed of lead peroxide, said electronegative electrode element being in a pulverulent form and disposed in intimate contact with said electropositive electrode element.

7. In dry surface contact rectifying devices and the like, an asymmetric couple comprising an electropositive electrode element formed of metallic tantalum and having a film coating of an oxide thereof, and an electronegative electrode element formed of lead peroxide, said electronegative electrode element being in pulverulent form and disposed in intimate contact with said electropositive electrode element.

In testimony whereof, SAMUEL RUBEN has signed his name to this specification, this fourteenth day of April, 1925.

SAMUEL RUBEN.